(12) United States Patent
Rietdijk

(10) Patent No.: US 8,595,978 B2
(45) Date of Patent: Dec. 3, 2013

(54) PATH-CONTROLLED WINDOW LIFTER OF A MOTOR VEHICLE

(75) Inventor: Dalibor Rietdijk, Wetzlar (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 28 days.

(21) Appl. No.: 13/002,040

(22) PCT Filed: Jun. 26, 2009

(86) PCT No.: PCT/EP2009/058048
§ 371 (c)(1),
(2), (4) Date: Dec. 29, 2010

(87) PCT Pub. No.: WO2010/003841
PCT Pub. Date: Jan. 14, 2010

(65) Prior Publication Data
US 2011/0107676 A1    May 12, 2011

(30) Foreign Application Priority Data

Jul. 9, 2008  (DE) .................. 10 2008 032 963
Nov. 3, 2008  (DE) .................. 20 2008 014 665 U

(51) Int. Cl.
*E05F 11/48*   (2006.01)
*E05F 11/38*   (2006.01)

(52) U.S. Cl.
USPC .............................................. 49/352; 49/348

(58) Field of Classification Search
USPC .................. 49/348, 349, 374, 375, 502, 352
See application file for complete search history.

(56) References Cited

U.S. PATENT DOCUMENTS

| 4,633,613 | A |   | 1/1987 | Kobayashi et al. |
| 5,351,443 | A | * | 10/1994 | Kimura et al. ................. 49/502 |
| 6,425,204 | B1 | * | 7/2002 | Renner .......................... 49/213 |
| 6,516,493 | B1 |   | 2/2003 | Seliger et al. |
| 6,874,279 | B1 | * | 4/2005 | Weber et al. ................... 49/352 |

(Continued)

FOREIGN PATENT DOCUMENTS

| DE | 31 26 065 A1 | 1/1983 |
| DE | 34 45 000 A1 | 6/1985 |

(Continued)

OTHER PUBLICATIONS

English translation of International Preliminary Report on Patentability dated Jan. 18, 2011 for corresponding PCT application No. PCT/EP2009/058048, 7 sheets.

(Continued)

*Primary Examiner* — Katherine Mitchell
*Assistant Examiner* — Scott Denion
(74) *Attorney, Agent, or Firm* — Christie, Parker & Hale, LLP

(57) ABSTRACT

A path-controlled window lifter of a motor vehicle is provided. The path-controlled window lifter includes a driver which is connected with a window pane of the motor vehicle and can be driven by means of a drive mechanism for adjusting the window pane, and a base plate mounted in the motor vehicle and composed of a carrier part and a reinforcement part, on which at least two guide paths are formed for guiding the driver and for adjusting the driver along an adjustment path formed by the guide paths. The carrier part and the reinforcement part are arranged at a distance from each other, but connected to each other at defined areas.

16 Claims, 20 Drawing Sheets

(56) References Cited

U.S. PATENT DOCUMENTS

| | | | |
|---|---|---|---|
| 7,076,918 B2 * | 7/2006 | Tatsumi et al. | 49/352 |
| 7,631,458 B2 * | 12/2009 | Moriyama et al. | 49/352 |
| 2004/0187391 A1 * | 9/2004 | Fenelon | 49/375 |
| 2006/0010772 A1 | 1/2006 | Fassbender et al. | |
| 2006/0037250 A1 * | 2/2006 | Staser | 49/502 |
| 2007/0119102 A1 | 5/2007 | Seibert | |
| 2007/0125000 A1 * | 6/2007 | Fenelon | 49/349 |
| 2007/0151158 A1 * | 7/2007 | Fenelon | 49/349 |
| 2011/0120019 A1 * | 5/2011 | Smith et al. | 49/349 |

FOREIGN PATENT DOCUMENTS

| | | |
|---|---|---|
| DE | 198 38 347 A1 | 2/2000 |
| DE | 101 44 777 A1 | 3/2003 |
| DE | 101 44 779 A1 | 3/2003 |
| DE | 102 39 447 B4 | 4/2003 |
| DE | 20 2004 010 955 U1 | 12/2005 |
| DE | 10 2004 048 017 A1 | 3/2006 |
| DE | 20 2005 018 470 U1 | 3/2006 |
| JP | 51-057422 | 10/1974 |
| JP | 03-023016 | 5/1991 |
| JP | 04-032187 B | 5/1992 |
| JP | 04-039984 | 9/1992 |
| JP | 2672928 | 7/1997 |
| WO | WO 03/045736 A2 | 6/2003 |
| WO | WO 2004/020770 A2 | 3/2004 |

OTHER PUBLICATIONS

International Search Report, dated Sep. 1, 2009, corresponding to PCT/EP2009/058048, 6 pages.

English translation of Japanese Examination Report dated Feb. 5, 2013 for Application No. 2011-517086, 2 pages.

Japanese Examination Report dated Feb. 5, 2013 for Application No. 2011-517086, 2 pages.

* cited by examiner

PATH-CONTROLLED WINDOW LIFTER OF A MOTOR VEHICLE

CROSS-REFERENCE TO A RELATED APPLICATION

This application is a National Phase Patent Application of International Patent Application Number PCT/EP2009/058048, filed on Jun. 26, 2009, which claims priority of German Patent Application Number 10 2008 032 963.0, filed on Jul. 9, 2008, and of German Utility Model Application Number 20 2008 014 665.8 filed on Nov. 3, 2008.

BACKGROUND

This invention relates to a path-controlled window lifter of a motor vehicle.

Path-controlled window lifters are used for example for adjusting window panes for frameless doors of a motor vehicle, in particular for convertible cars. Beside the main adjusting movement in pull-off direction of the window pane, i.e. substantially in direction of the vertical or Z-axis of the motor vehicle, a guide path serves to guide a driver connected with the window pane and hence the window pane in direction of the Y-axis of the motor vehicle, i.e. vertical to the X-axis or longitudinal axis of the vehicle and Z-axis of the motor vehicle. The guidance in Y-direction of the motor vehicle is utilized to urge the window pane to the inside against a seal to completely close the window pane and thus to ensure a safe closing of the window pane. For this purpose, the path-controlled window lifter additionally can perform small adjusting movements in X- and Y-direction of the motor vehicle, which are defined by the course of the guide paths.

Such path-controlled window lifters have a large-surface base or base plate made of sheet metal, into which two or mostly three guide paths are stamped as profiled slots. Since the base plate is cut up in this way over the entire guide length, bridges are necessary on the one hand as a connection of both sides of the guide paths, and on the other hand the metal sheet must be designed thick-walled, in order to provide the base plate with the required stability and in particular inherent rigidity. In turn, this involves a high weight of the path-controlled window lifter and hence an undesired gain in weight of the motor vehicle.

From DE 101 44 777 A1 a path-controlled window lifter is known which includes a base plate mounted in the motor vehicle, which includes three guide paths for guidance and for adjustment of a driver along an adjustment path formed by the guide paths. The course of the individual guide paths is different, depending on the position into which the window pane is to be moved during the adjustment. To avoid breaking through the structure of the base plate, which would lead to a weakening of the mechanical stability of the base plate, which is required, however, to absorb the adjustment forces acting on the base plate, either the middle one of the three guide paths is put onto the base plate and forms an integral part of the base plate, or a guide path is fixed on the base plate as separate part by latching, screwing, bonding or press-fitting. The guide path formed as an integral part of the base plate is integrally connected with supporting structural elements of the base plate, so that the forces acting on the guide path can be absorbed by the structural elements of the base plate.

Furthermore, the base plate can be formed in several parts and the middle guide path can be integrated into a part of the base plate. As an alternative to an insert or outsert technique, a plastics-metal hybrid construction is proposed, in order to manufacture the structure of a multi-part base plate. Between the various parts of the base plate, attachments such as positive, non-positive or integral connections serve to increase the rigidity of the entire structure. For this purpose, a profiled metal sheet is at least partly overmolded by plastic material and reinforced by the ribs of the plastic material.

SUMMARY

It is the object of the present invention to create a path-controlled window lifter of a motor vehicle, which with minimum weight ensures a permanently proper function even in the case of adjusting movements in X- and Y-direction of the motor vehicle.

A first solution of an exemplary embodiment of the invention characterizes a path-controlled window lifter of a motor vehicle with a driver which is connected with a window pane of the motor vehicle and can be driven by means of a drive mechanism for adjusting the window pane, and with a multi-part base plate mounted in the motor vehicle, on which at least two guide paths for guiding the driver and for adjusting the driver are formed along an adjustment path formed by the guide paths, wherein the base plate consists of a carrier part and a reinforcement part, which are arranged at a distance from each other in the manner of an upper flange and a lower flange of an I-beam and are firmly connected with each other.

This first solution of the object underlying the present invention provides a path-controlled window lifter of a motor vehicle, which with minimum weight ensures a permanently proper function even in the case of adjusting movements in X- and Y-direction of the motor vehicle. In particular, the ratio of the rigidity to the weight of the window lifter is optimal, so that even large forces acting on the path-controlled window lifter, in particular in X- and Y-direction of the motor vehicle, do not lead to bending of the base plate of the window lifter and hence an optimum guidance of the window pane is ensured along its entire adjustment path.

The composition of the base plate of a carrier part and a reinforcement part, which are arranged at a distance from each other and are firmly connected with each other in the manner of an upper flange and a lower flange of an I-beam, creates the basis for also using thin and light-weight materials, which as a result of the stable bridge construction of the carrier part and reinforcement part ensure a high ridigity of the base plate. By dividing the base plate into a reinforcement part and a carrier part, an optimum arrangement and integration of the guide paths into the divided base plate also is possible without any supports, and a ratio between size, weight and rigidity of the base plate optimized for each path-controlled window lifter can be adjusted.

Exemplary, the carrier part and the reinforcement part each form part of the guide paths, wherein in an exemplary embodiment the reinforcement part forms two guide paths and the carrier part forms one guide path.

The distribution of the guide paths onto the carrier part and the reinforcement part allows to realize an almost arbitrary course of the guide paths in all planes and in particular also in the Y-Z-plane and the X-Z-plane. Furthermore, by distributing the guide paths onto the carrier part and the reinforcement part main and secondary guides can be formed, wherein for tolerance reasons two guide paths of the main guide are arranged on the reinforcement part, which due to the higher load can be formed stronger than the carrier part, whereas the secondary guide is realized by one single guide path which is arranged on the carrier part as a wraparound.

Corresponding to the different tasks of the main and secondary guides, the guide paths of the reinforcement part include supports for the driver in X- and Y-direction of the motor vehicle, whereas the guide path of the carrier part forms a support only in Y-direction of the motor vehicle, wherein the guide paths of the reinforcement part have a smaller distance to each other than to the guide path of the carrier part.

The closely spaced guide paths of the main guide take up the main load and thereby create a stable basis in Z-direction.

In an exemplary aspect of the invention, the guide paths are formed in the edge region of the carrier part and reinforcement part.

The formation of the guide paths in the edge regions ensures a simple, uninterrupted guidance of the driver of the path-controlled window lifter, which hence does not break through the strength structure of the reinforcement part and of the carrier part, without a risk of jamming of the driver even with great changes in direction of the adjustment path and movements in particular in X- and Y-direction of the motor vehicle.

As an alternative to the formation of the guide paths on the carrier part and the reinforcement part, the guide paths can be limited to the reinforcement part, whereas a third guide cooperates with the window pane and/or a lifting rail accommodating the window pane. The third guide preferably consists of a wraparound of at least one window pane edge lateral with respect to the pull-off direction of the window pane, which is arranged in the door gutter and/or the door body and/or the motor vehicle body.

In this embodiment, the driver is exclusively guided on the guide path of the reinforcement part, whereas the carrier part accommodates the reinforcement part and functional elements of the window lifter, such as the drive unit of the window lifter comprising drive motor, transmission and electronic controller, sensors, for example crash sensors, deflection elements, namely deflection pulley or deflection runners, stops for the driver attached to or integrated in the carrier part, or other functional elements, such as points for mounting to the body, cable clips, loudspeakers and the like. In this embodiment, the third guide of the path-controlled window lifter is realized for example by a wraparound of at least one window pane edge lateral in pull-off direction of the window pane, one or more support rollers engaging the window pane edge or the like in the door gutter or the door body or the motor vehicle body, which adjoin the lateral window pane edges.

To minimize the weight of the path-controlled window lifter taking into account the different loads and materials of the reinforcement part and the carrier part, the width of the reinforcement part vertical to the adjustment direction of the driver is smaller than the width of the carrier part.

To achieve a minimum construction depth of the path-controlled window lifter in Y-direction of the motor vehicle because of the limited thickness in particular of motor vehicle doors, the reinforcement part preferably is inserted into a stepped portion of the carrier part extending vertical to the longitudinal extension of the carrier part.

The adjustment and maintenance of the distance between the reinforcement part and the carrier part to form an upper flange and a lower flange in the manner of an I-beam and/or a bridge construction is effected either via formations and/or bulges of the carrier part and/or of the reinforcement part or by a separate component arranged between the carrier part and the reinforcement part, for example in the form of a wave-shaped intermediate section, and/or by a foam insert connecting the carrier part and the reinforcement part, which connects the carrier part and the reinforcement part with each other in a stable sandwich construction.

The firm connection between the reinforcement part and the carrier part to achieve a high rigidity in the manner of an I-beam is effected by a positive, non-positive or integral connection between the carrier part and the reinforcement part, in particular by screwing, riveting, clinching, welding, bonding or the like.

To optimize the rigidity-weight ratio of the base plate with the aim of a minimum total weight of the path-controlled window lifter by ensuring a high force absorption, the base plate is composed of a reinforcement part and a carrier part, whose material selection, shape, size and composition can individually be adapted to the specific requirements of a path-controlled window lifter.

Correspondingly, the carrier part and the reinforcement part can either be made of the same or a similar material or alternatively of different materials.

When using the same material for the carrier part and the reinforcement part, the reinforcement part subjected to a higher load has a greater material thickness than the carrier part.

When using similar materials, the strength of the reinforcement part is dimensioned greater than that of the carrier part, in particular the reinforcement part is made of high-strength steel or fiber-reinforced plastics and the carrier part is made of low-strength steel or plastics.

When the carrier part and a reinforcement part are made of different materials,
  the reinforcement part is made of a metal with high specific weight, in particular of steel, and the carrier part is made of a light metal,
  the reinforcement part is made of a cast magnesium alloy, in particular with spatial structure, and the carrier part is made of a metal sheet, or
  the reinforcement part is made of metal and the carrier part is made of plastics.

In a further exemplary solution of the invention for a path-controlled window lifter of a motor vehicle, the driver is connected with the guide paths via sliders, which are mounted to be rotatable about the Y-axis of the motor vehicle and pivotable about an axis oriented vertical to the guide paths and substantially located in the plane of the window pane.

This solution creates a path-controlled window lifter with high efficiency and optimized sliding properties of the driver along the guide paths with an optimum adaptation and alignment of the driver corresponding to the course of the guide paths, in particular due to the omission of spring-loaded clamps in the region of the plain bearings of the driver, which can move in all degrees of freedom without jamming.

In addition, this solution ensures a minimum construction depth of the path-controlled window lifter in Y-direction of the motor vehicle and hence an extremely compact, path-controlled window lifter.

Due to the improved efficiency during adjustment of the driver along the adjustment path of the path-controlled window lifter, smaller drive motors can be used for the window lifter drive, which in turn means a reduced load for the entire structure of the path-controlled window lifter and contributes to a further reduction in weight of the window lifter.

In an exemplary embodiment, at least one slider includes a guide piece with sliding surfaces accommodating the guide path and a conical oblong hole, through which a ball pin extends, whose one end is partly spherical and is mounted in a partly spherical recess of the guide piece and whose other end is firmly connected with the driver, wherein to achieve the pivotability of the slider between the driver and the guide piece a bearing cup rotatable about the ball pin is arranged, whose side resting against the guide piece forms a cylindrical-portion-shaped contact surface with the guide piece.

In this embodiment of the slider, the guide pieces engaging in the guide paths move along the guide paths and adapt their movement to the course of the guide paths. As a first degree of freedom a displacement of the slider along the guide path is required, as a second degree of freedom a rotation between the guide path and the driver, which is achieved by the stationary axis of the ball pin, and as a third degree of freedom swivelling of the slider about the respective X-axis with respect to the guide path is required, in order to compensate angular deviations with respect to the driver. These requirements are satisfied by the sliding surfaces extending transverse to the connection of the slider to the driver, the mounting of the ball pin firmly connected with the driver in a partly spherical recess of the guide piece, and the pivotability of the ball pin in the conical oblong hole of the guide piece as well as by the cylindrical-portion-shaped contact surface between the bearing cup and the guide piece.

To compensate tolerances and to avoid noise, a spring element can be arranged between the bearing cup and the driver, which can be formed as disk spring, spiral spring or as integrally molded spring with elastomers.

To optimize the sliding properties, sliding inserts with sliding properties optimized with respect to the material of the guide path can be inserted into the sliding surfaces of the guide piece, in particular when the sliding properties of the sliding surfaces formed in the guide piece are not sufficient, for example when using a fiber-reinforced plastic material or a cast light metal for the guide piece.

To design the path-controlled window lifter in the upper gutter region of the body, in particular of the door body, as narrow as possible in Y-direction of the motor vehicle and hence achieve a high compactness of the path-controlled window lifter in Y-direction, the guide pieces are arranged offset with respect to the guide path, in that the conical oblong hole of the guide piece accommodating the ball pin is arranged offset with respect to the guide path. As a result, a better introduction of forces acting in Y-direction of the motor vehicle is achieved, since a partial overlap of the head of the bearing pin on the one hand and of the guide paths of the reinforcement part or carrier part on the other hand is obtained.

To prevent tilting of the sliders in Y-direction of the motor vehicle, the conical oblong hole of the guide piece is formed to extend in only one direction and the cylindrical-portion-shaped contact surface between the guide piece and the bearing cup permits only one swivel direction.

BRIEF DESCRIPTION OF THE DRAWINGS

The invention will be explained in detail below with reference to embodiments illustrated in the Figures of the drawing.

DETAILED DESCRIPTION

Figure 1:
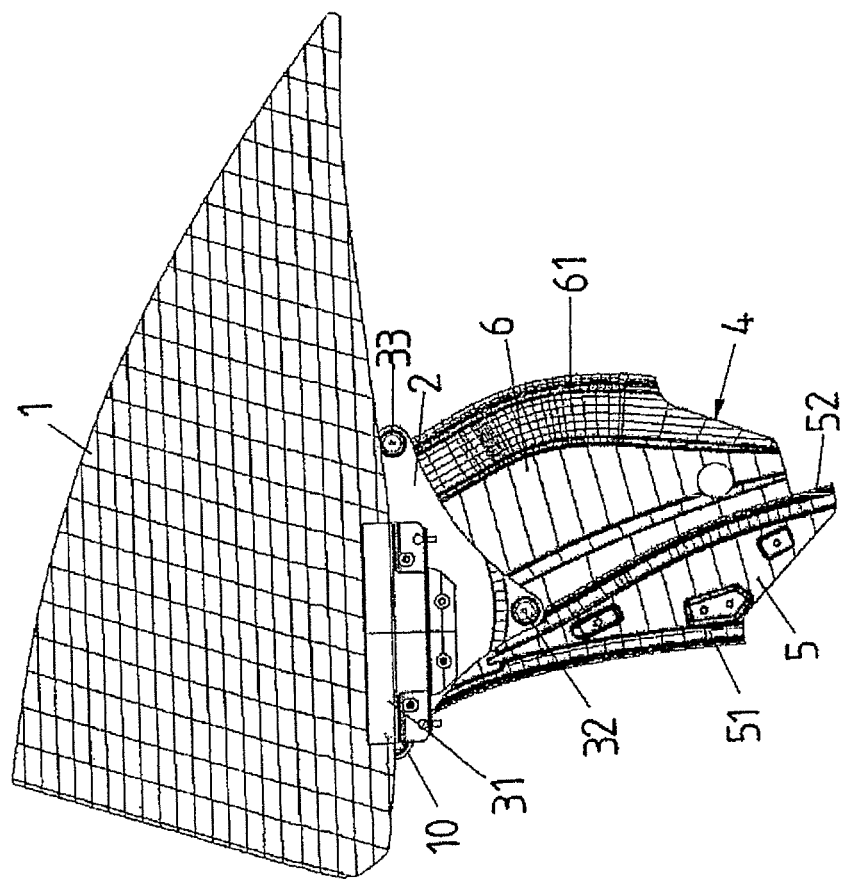
FIG. 1 shows a front view of a part of a path-controlled window lifter with a window pane to be adjusted along an adjustment path.

FIG. 1 shows the front view of a part of a path-controlled window lifter of a motor vehicle for adjusting a window pane 1 along a specified adjustment path. The lower edge of the window pane 1 is firmly mounted in a pane holder 10 which is connected with a lifting rail and/or a driver 2. The driver 2 is moved along the specified adjustment path by means of a drive mechanism shown in FIG. 6, so that the window pane 1 connected with the driver 2 via the pane holder 10 is moved upwards and downwards and is swivelled in the window pane plane and vertically thereto. For this purpose, the driver 2 includes three sliders 31, 32, 33 which positively engage in guide paths 51, 52, 61 of a base plate 4 inserted into the motor vehicle, for example into a motor vehicle door.

Figure 2:
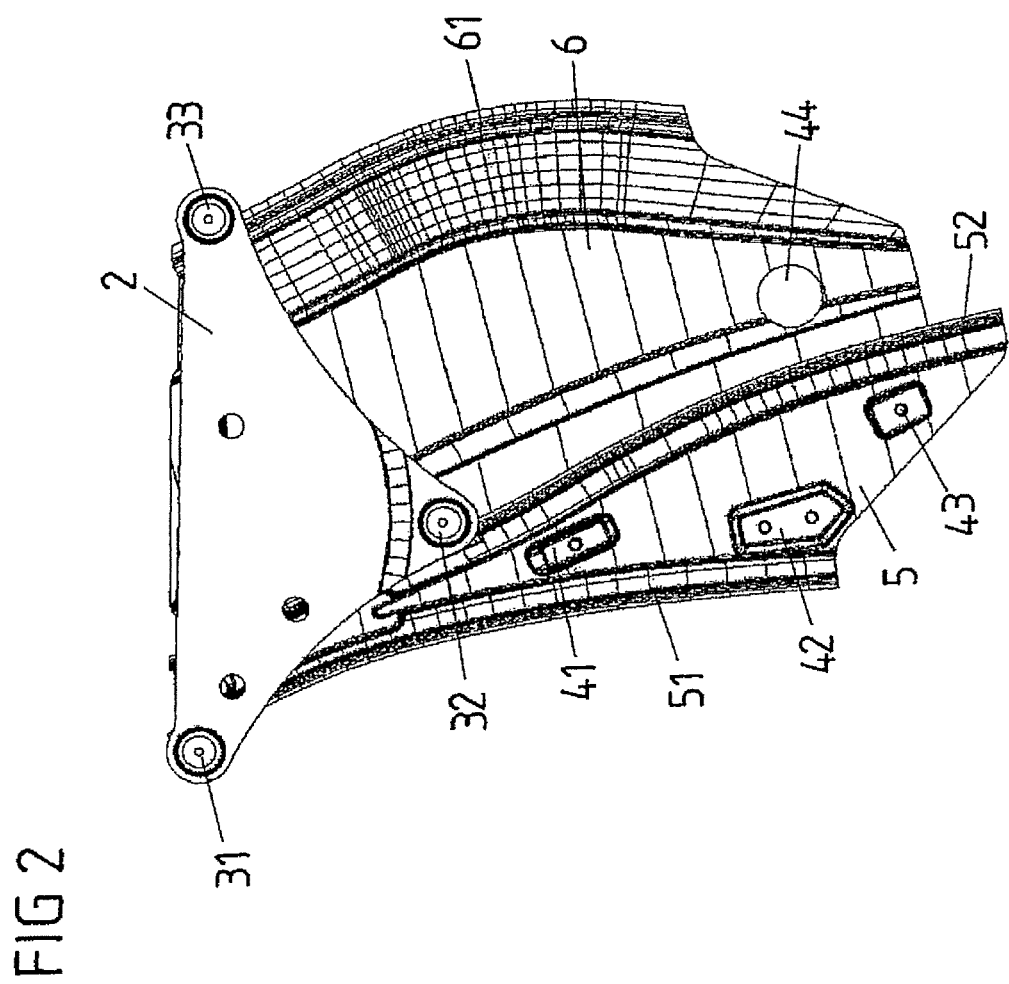
FIG. 2 shows an enlarged representation of the base plate of the path-controlled window lifter with a driver adjustable along the guide paths.
Figure 7:
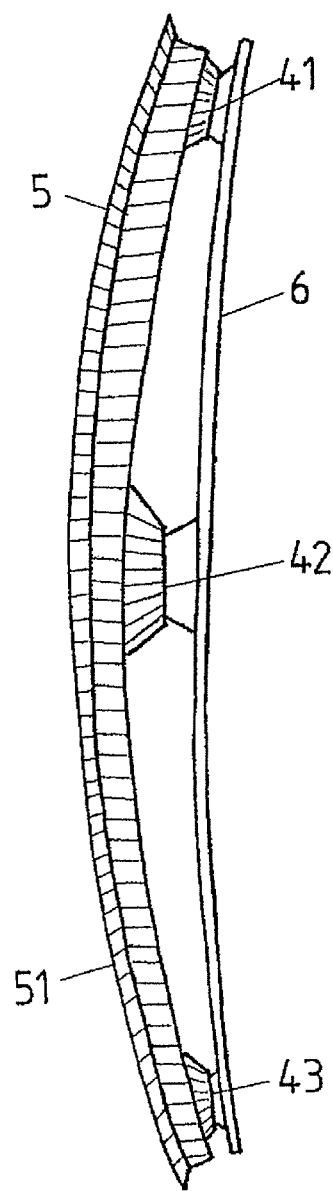
FIG. 7 shows a side view of the base plate composed of a reinforcement part and a carrier part.
Figure 8:
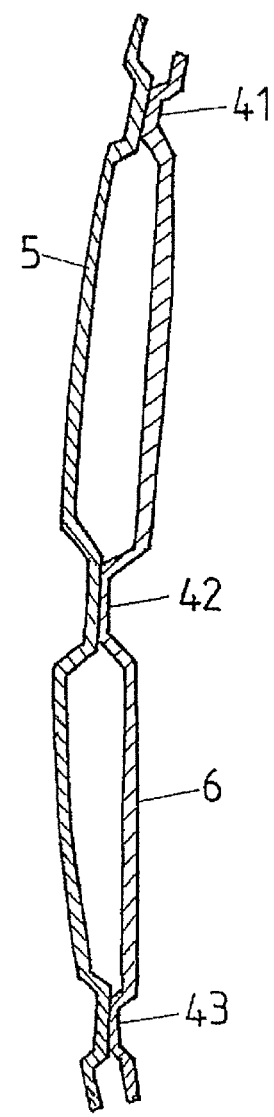
FIG. 8 shows a longitudinal section through the base plate of FIG. 7.
Figure 9:
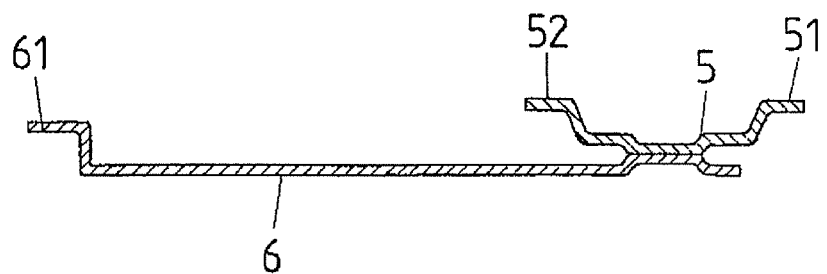
FIG. 9 shows a horizontal cross-section through the base plate of FIGS. 7 and 8.

The base plate 4, which is shown in FIG. 2 on an enlarged scale, in FIG. 3 in a topside view, in FIG. 4 in a view obliquely from below, in FIG. 5 from the rear side, in FIG. 7 in a side view, in FIG. 8 in a longitudinal section and in FIG. 9 in a horizontal cross-section, consists of a narrow reinforcement part 5 and a broader carrier part 6, which are connected with each other via formations and/or bulges 41, 42, 43 and thereby form an upper flange and a lower flange of a component formed in the manner of an I-beam, so that the inherent rigidity of the base plate 4 is determined by this bridge construction to a considerable extent. The formations and/or bulges 41, 42, 43 of the reinforcement part 5 and carrier part 6 determine their mutual distance as well as the beam tie structure of the connection of both parts 5, 6 to ensure a high inherent rigidity of the base plate 4 composed of the two parts.

To optimize the ratio of inherent rigidity to the weight of the base plate 4, identical, similar or different materials can be used for the reinforcement part 5 and the carrier part 6 corresponding to the respective tasks and functions of the reinforcement part 5 and the carrier part 6.

When using the same material for the carrier part and the reinforcement part, the reinforcement part subjected to a higher load has a greater material thickness than the carrier part.

When using similar materials, the strength of the reinforcement part is dimensioned greater than that of the carrier part, in particular the reinforcement part is made of high-strength steel or fiber-reinforced plastics and the carrier part is made of low-strength steel or plastics.

When the carrier part and a reinforcement part are made of different materials,
the reinforcement part is made of a metal with high specific weight, in particular of steel, and the carrier part is made of a light metal,
the reinforcement part is made of a cast magnesium alloy, in particular with spatial structure, and the carrier part is made of a metal sheet, or
the reinforcement part is made of metal and the carrier part is made of plastics.

Figure 4:
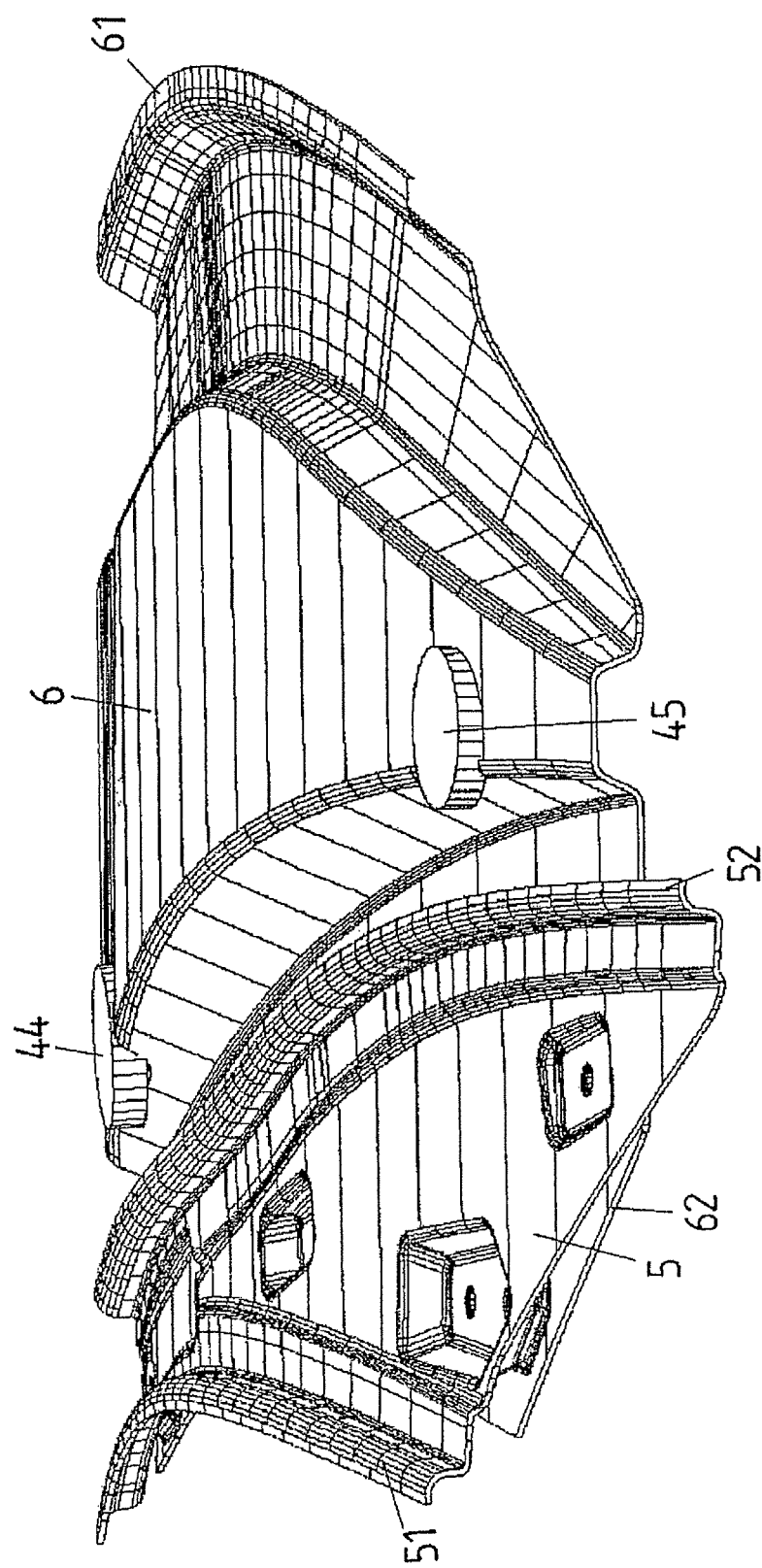
FIG. 4 shows a three-dimensional representation of the base plate as seen from its bottom surface.
Figure 5:
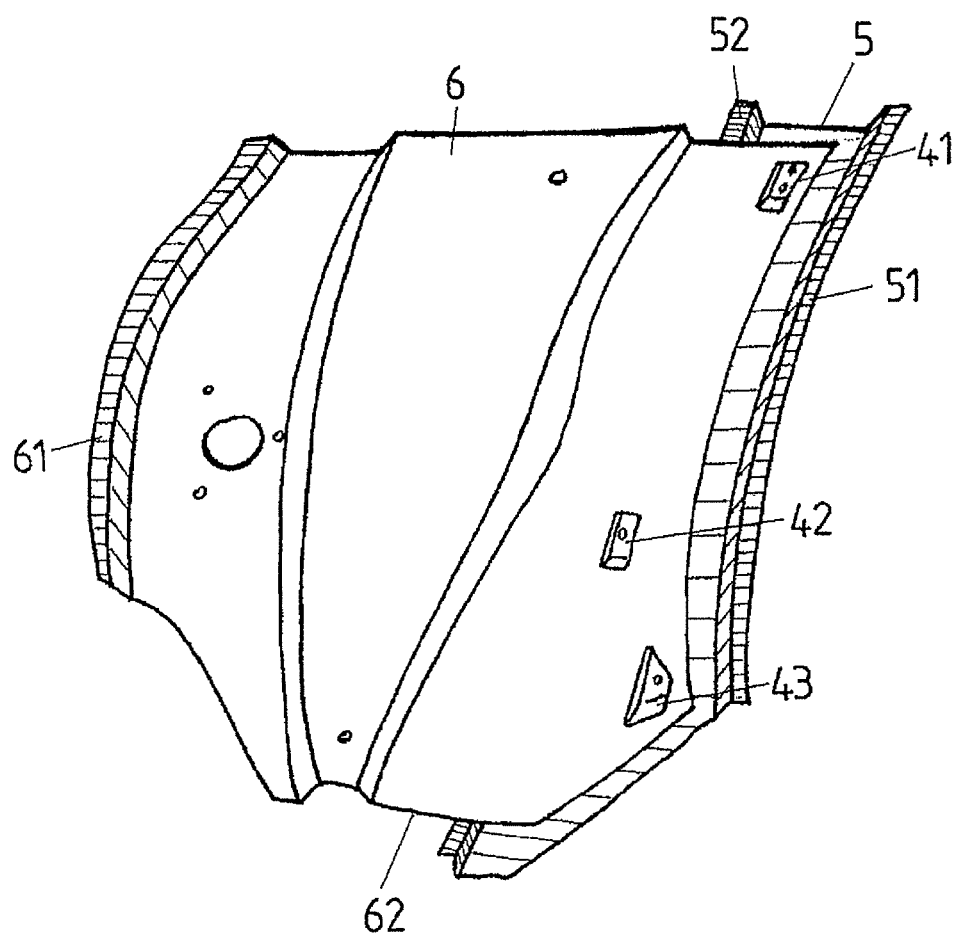
FIG. 5 shows a three-dimensional representation of the rear side of the base plate.

To achieve a small construction depth in Y-direction of the motor vehicle, the reinforcement part 5—as can be taken in particular from the perspective view of FIG. 4—is inserted into a stepped portion 62 of the carrier part 6 profiled in Y-direction of the motor vehicle and is formed much narrower with respect to the adjustment path than the carrier part 6, so that the generally higher specific weight of the reinforcement part 5 made of a high-strength material as compared to the carrier part 6 which is distinctly greater, but is made of a material with low weight contributes to the total weight of the base plate 4 to a smaller extent.

The connection between the reinforcement part 5 and the carrier part 6 can be effected in any desired way by a positive, non-positive or integral connection, for example by using screws, riveting, clinching, welding, bonding or the like.

The angled outer edges of the reinforcement part 5 form the guide paths 51, 52 of a main guide of the path-controlled window lifter, whereas the outer edge of the carrier part 6 opposite to the connection of the carrier part 6 with the reinforcement part 5 forms a guide path 61, which serves as secondary guide, as a wraparound guide. For tolerance reasons, the guide paths 51, 52 forming the main guide, which cooperate with the sliders 31, 32 of the driver 2, are disposed on the same component of the base plate 4, namely the reinforcement part 5, which due to the resulting higher loads is fabricated of a stronger material than the driver part 6 subjected to a smaller load. The guide paths 51, 52 forming the main guide are arranged as closely spaced as possible with respect to each other, in order to obtain a stable basis of the base plate 4 in Z-direction of the motor vehicle, i.e. in direction of the vertical axis of the motor vehicle.

The connection of the multi-part base plate 4 composed of the reinforcement part 5 and the carrier part 6 with parts of the body of the motor vehicle is effected via only few attachments, of which the attachments 44, 45 are shown in FIGS. 1 to 4.

Figure 3:
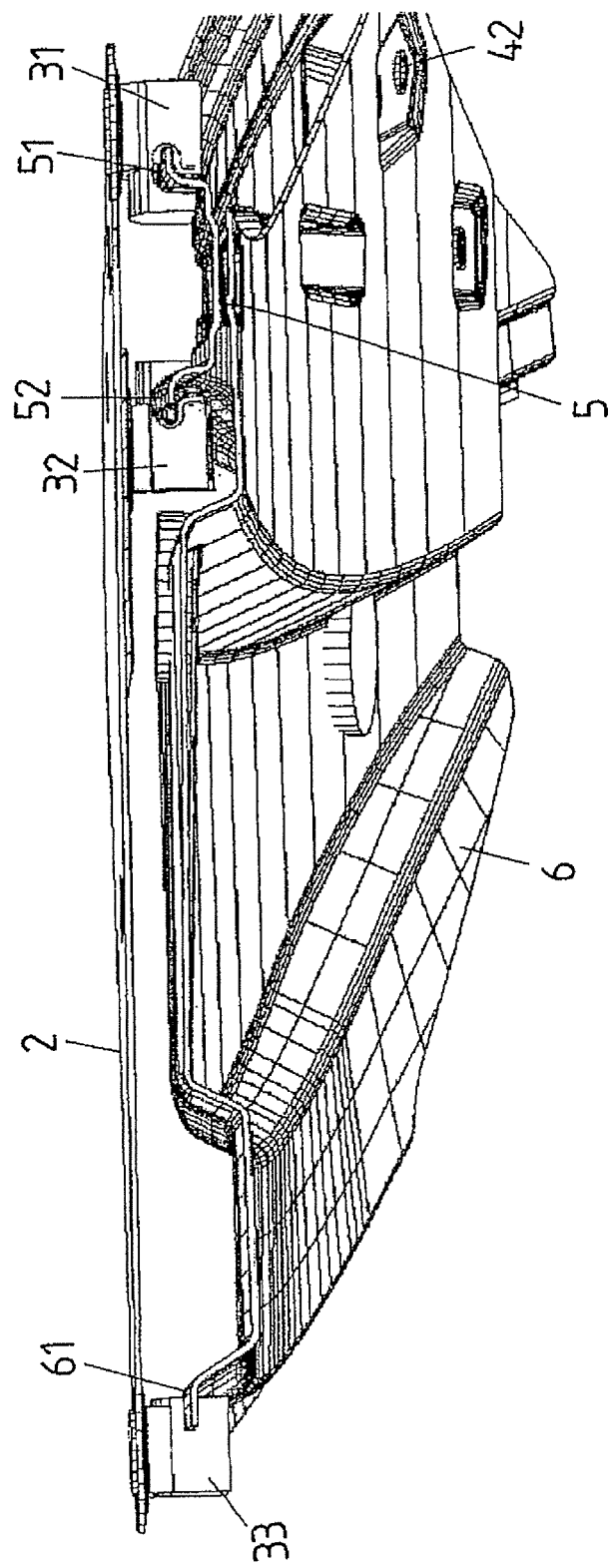
FIG. 3 shows a three-dimensional representation of the window lifter as seen from its upper surface.

In a view from above onto the driver 2 and the base plate 4, FIG. 3 illustrates the cooperation of the sliders 31, 32, 33 connected with the driver 2 with the guide paths 51, 52 at the outer edges of the reinforcement part 5 and/or of the guide path 61 at the opposite outer edge of the carrier part 6. Due to the omission of spring-loaded clamps required in known path-controlled window lifters in the region of the sliding surfaces of the sliders 31, 32, 33, the sliding properties of the sliders 31, 32, 33 on the guide paths 51, 52, 61 and hence the efficiency of the path-controlled window lifter are distinctly improved. In addition, the guide paths 51, 52, 61 can be designed of simple construction, namely as simple bends of the outer edges of the reinforcement part 5 or of the opposite outer edge of the control part 6, without having to specify a corresponding complicated geometry. Rather, only a sufficient wall thickness is required for a stamped rail with Z-profile.

Figure 6:
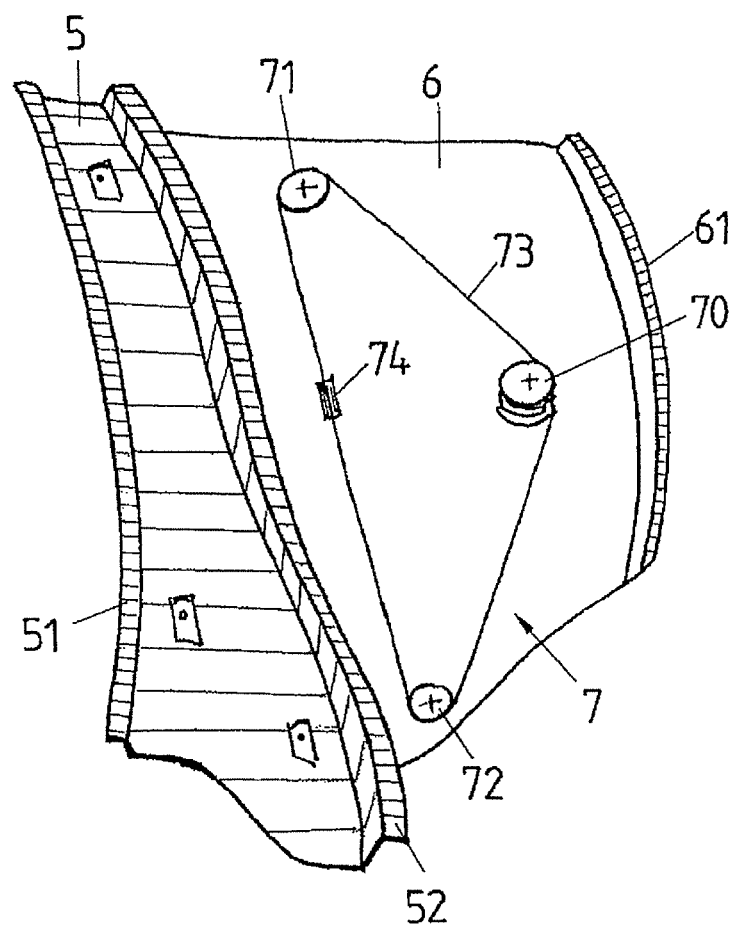
FIG. 6 shows a schematic, three-dimensional representation of the base plate with a drive mechanism of a path-controlled window lifter arranged thereon.

FIG. 6 shows a schematic, perspective front view of the base plate 4 of the path-controlled window lifter, which is composed of the reinforcement part 5 and the carrier part 6 in the manner of an I-beam, with a drive mechanism 7 arranged on the carrier part 6. The drive mechanism 7 consists of a rope drum 70 connected with an electromotive or manual window lifter drive, onto which a window lifter rope 73 is wound, which is guided around deflection means 71, 72 which constitute deflection runners or rope pulleys, and which is connected with the driver 2 via rope nipples inserted into a nipple chamber 74.

To adjust the driver 2 along the adjustment path formed by the guide paths 51, 52 at the outer edges of the reinforcement part 5 and/or of the guide path 61 at the outer edge of the carrier part 6 opposite the connection of the reinforcement part 5 with the carrier part 6, the window lifter rope 73 is driven by the window lifter drive and the rope drum 70 in the one or other direction of rotation in clockwise or counterclockwise direction about the deflection means 71, 72, and the driver 2 as well as the window pane 1 connected with the driver 2 via the pane holder 10 thereby is lifted or lowered and is swivelled in the window pane plane or vertically thereto corresponding to the geometrical allocation of the guide paths 51, 52, 61.

Due to the arrangement of the guide paths 51, 52, 61 at the outer edges of the reinforcement part 5 and the carrier part 6, slotted guide paths can be omitted, which would decrease the strength structure of the base plate 4 and would have to be reinforced with stirrups. Since the guide paths 51, 61 are arranged at the outer edges of the base plate 4, the installation space in Z-direction of the motor vehicle, i.e. in direction of the vertical axis of the motor vehicle and hence in direction of adjustment of the window pane, is utilized in a distinctly better way as compared to known path-controlled window lifters, since with an optimum support of the driver 2 no lateral residual material of the base plate 4 must be left, in order to arrange slotted or top-mounted guide paths in or on the base plate 4.

Figure 10:
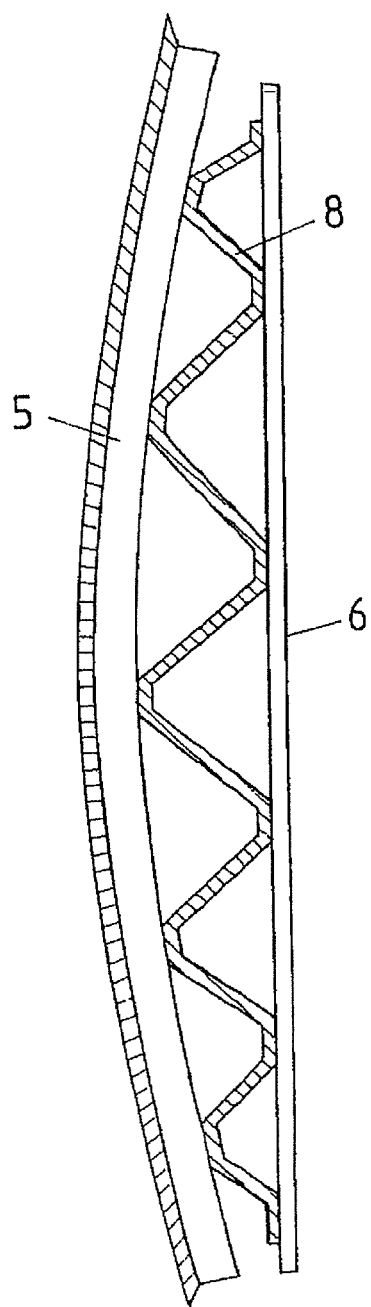
FIG. 10 shows a side view of a base plate with a separate intermediate part between the reinforcement part and the carrier part.
Figure 11:
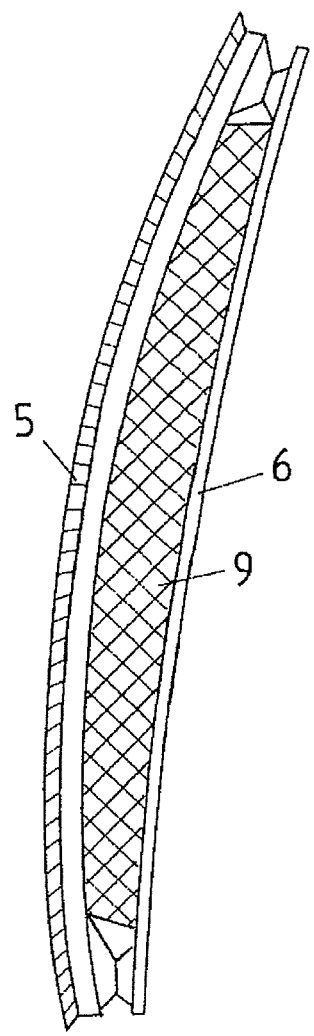
FIG. 11 shows a side view of a base plate with a foam fill between the reinforcement part and the carrier part.

Instead of formations and/or bulges of a structured reinforcement part 5 and structured carrier part 6 for adjusting the distance between the reinforcement part 5 and the carrier part 6 to form the bridge construction of the base plate 4 optimizing the inherent rigidity, a separate intermediate part in the form of a wave-shaped intermediate section 8 as shown in FIG. 10 or a foam fill 9 between the reinforcement part 5 and carrier part 6 connected at their ends via formations and/or bulges, as shown in FIG. 11, can be provided in particular when using non-structured reinforcement and carrier parts 5, 6, wherein said form fill provides a sandwich construction which increases the inherent rigidity of the base plate 4.

Figure 12:
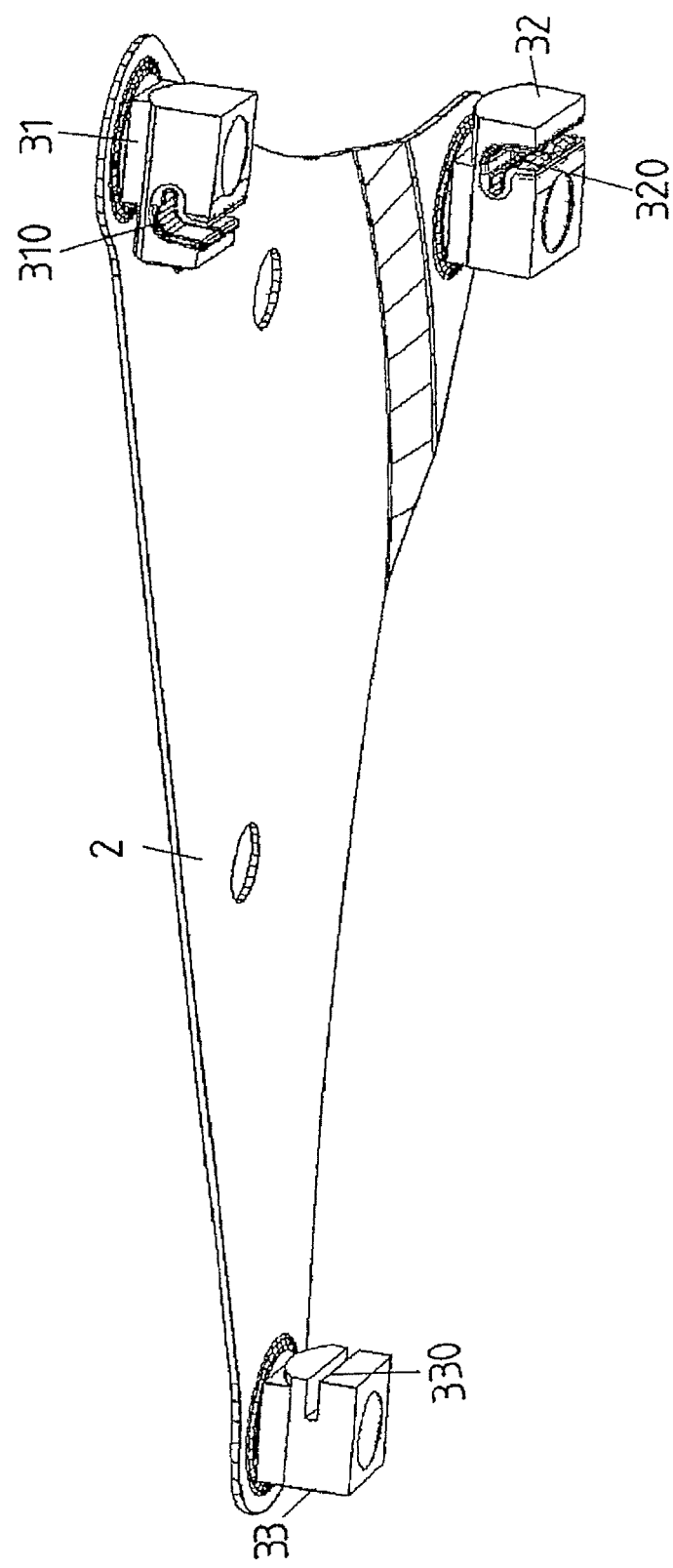
FIG. 12 shows a perspective representation of a driver with three sliders.

FIG. 12 shows a perspective view of the driver 2 with the three sliders 31, 32, 33 cooperating with the guide paths 51, 52, 61 of the base plate 4. The structure of the substantially identically constructed sliders 31, 32, 33 will be explained in detail below with reference to FIGS. 16 to 21.

The two sliders 31, 32 cooperating with the guide paths 51, 52 forming the main guide at the outer edge of the reinforcement part 5 include sliding surfaces 310, 320 which provide for a guidance and hence force absorption both in X- and in Y-direction of the motor vehicle. On the other hand, the third slider 33 formed as wraparound slider is provided with a sliding surface 330 which provides no guidance in X-direction of the motor vehicle, so that the third slider 33 only absorbs forces in Y-direction of the motor vehicle.

By using a simple wraparound slider for the secondary bearing, the efficiency of the path-controlled window lifter is additionally improved, since strain can be excluded in X-direction of the motor vehicle. To provide for using identical parts, however, a slider 33 corresponding to the sliders 31, 32 can be used for the secondary bearing instead of a simple wraparound slider for a force absorption both in X- and in Y-direction of the motor vehicle.

Figure 13:
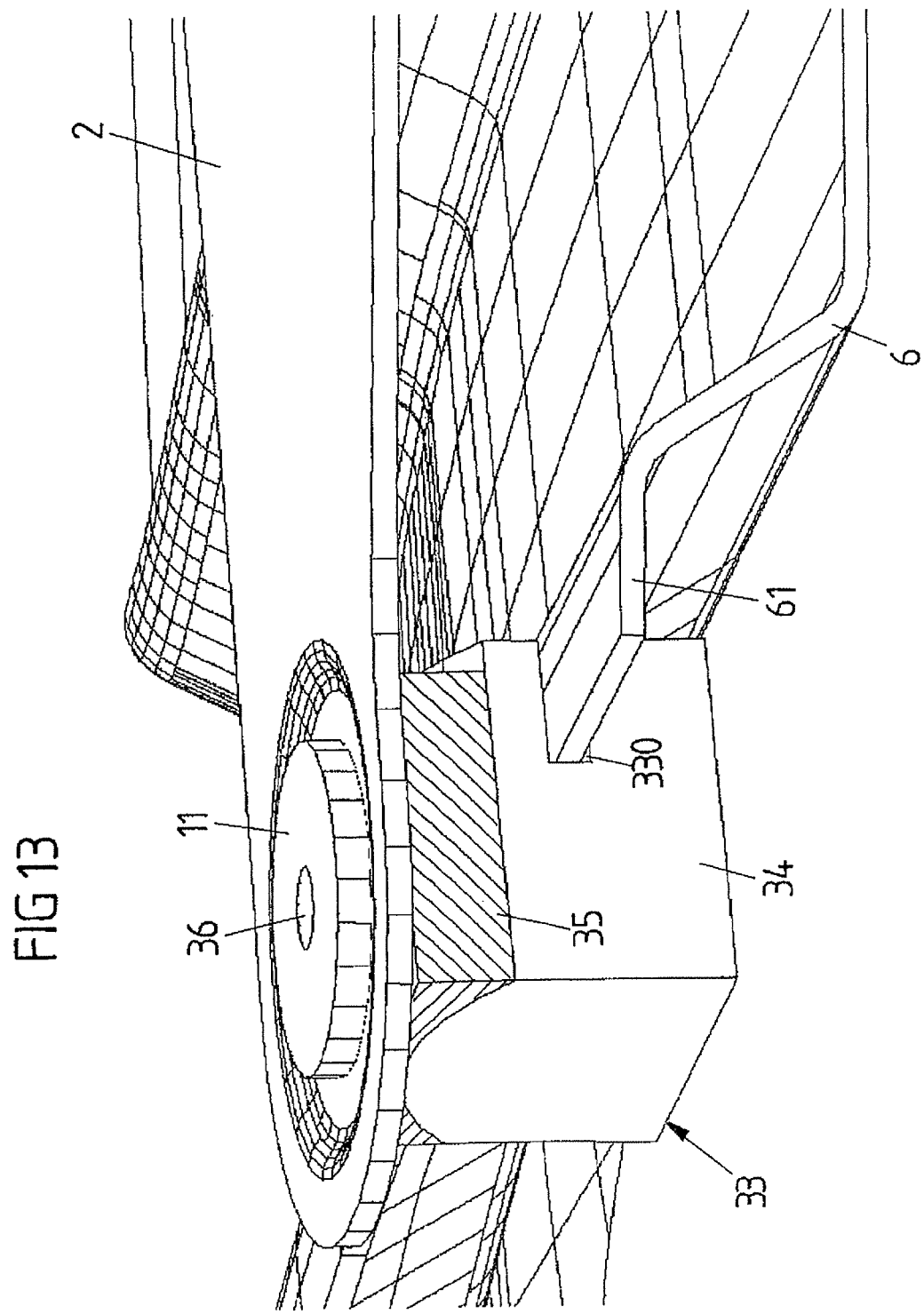
FIG. 13 shows an enlarged perspective representation of a slider formed as wraparound slider.
Figure 14:
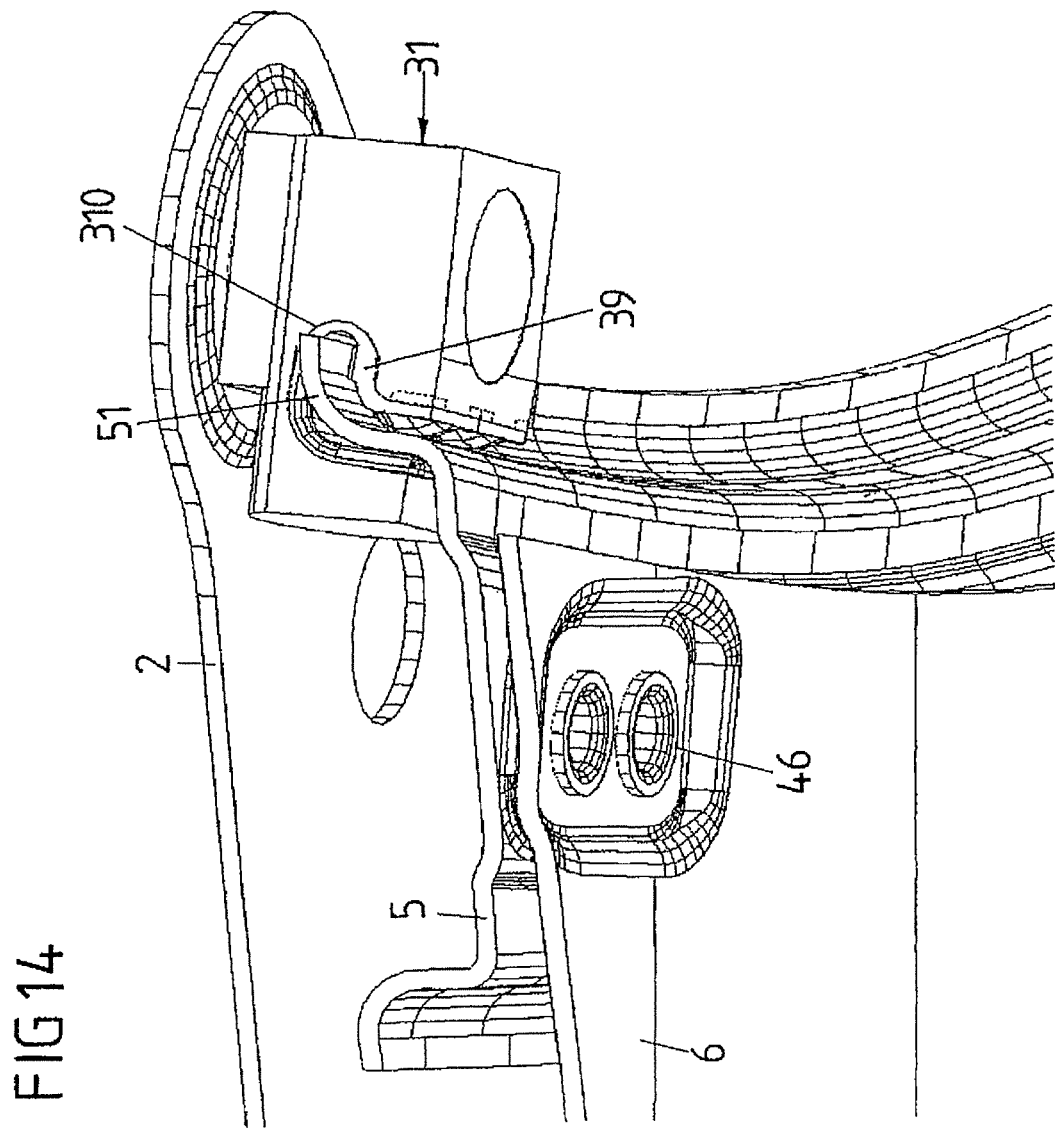
FIG. 14 shows a perspective representation of a slider extending around the edge region in the upper part of the reinforcement part for force absorption in X- and Y-direction of the motor vehicle.
Figure 15:
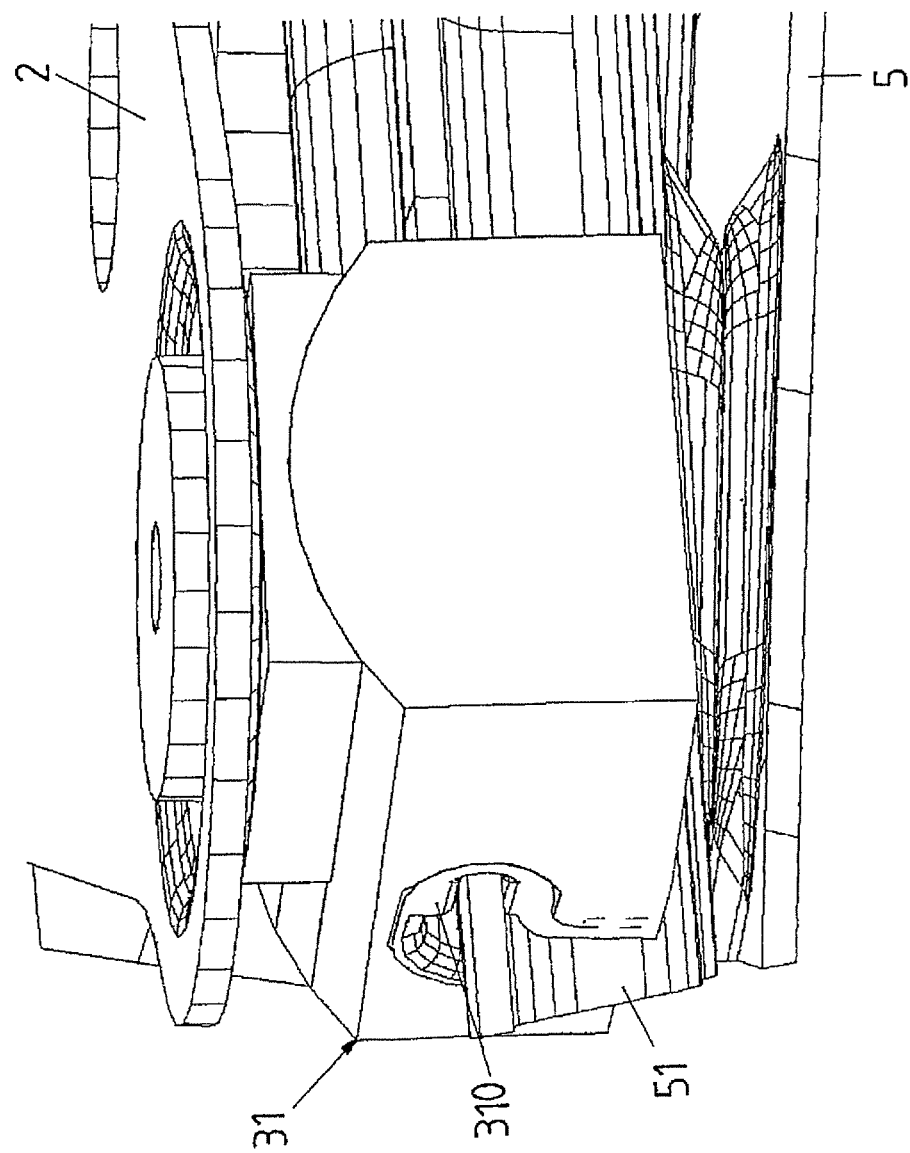
FIG. 15 shows an enlarged perspective representation of the slider of FIG. 14.
Figure 16:
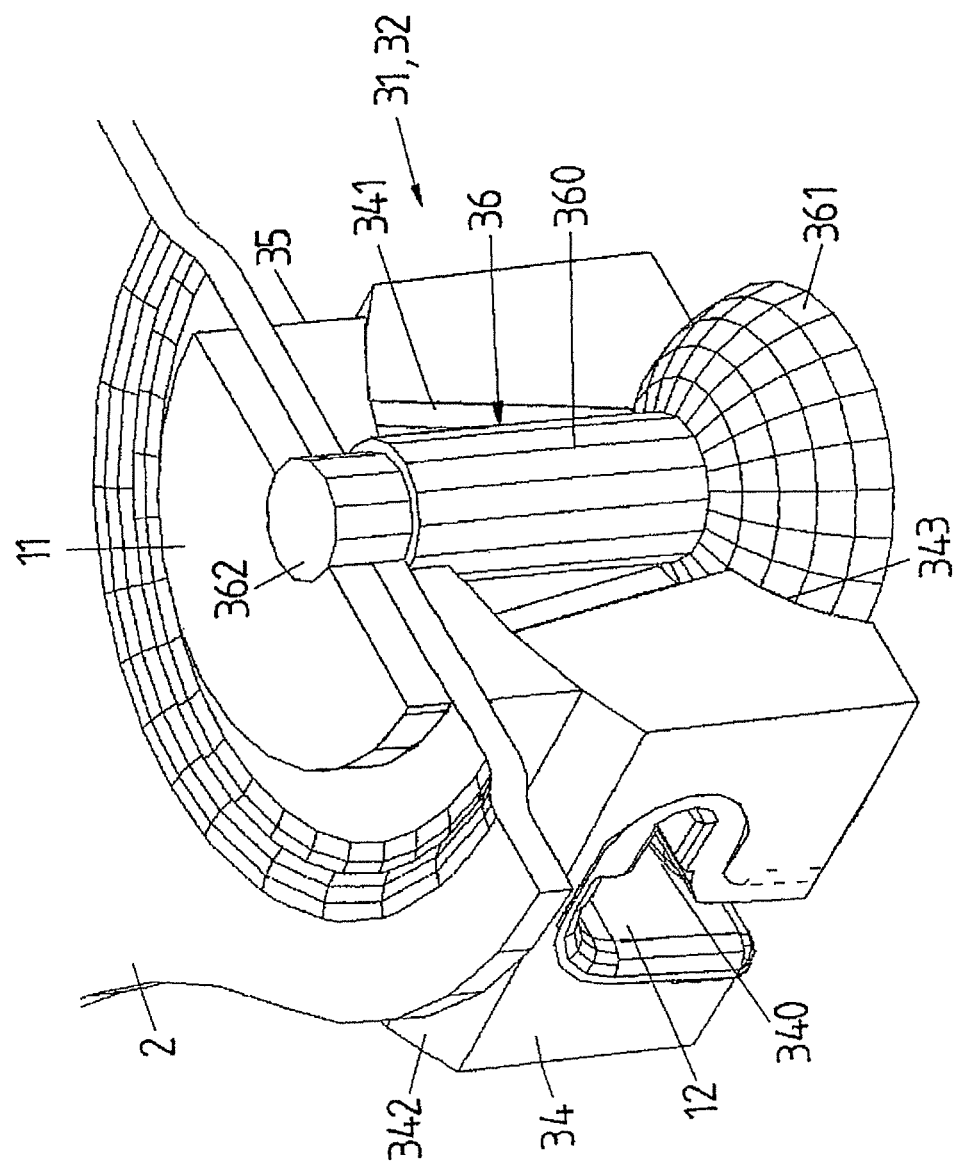
FIG. 16 shows a partial section through the slider shown in FIGS. 14 and 15.
Figure 17:
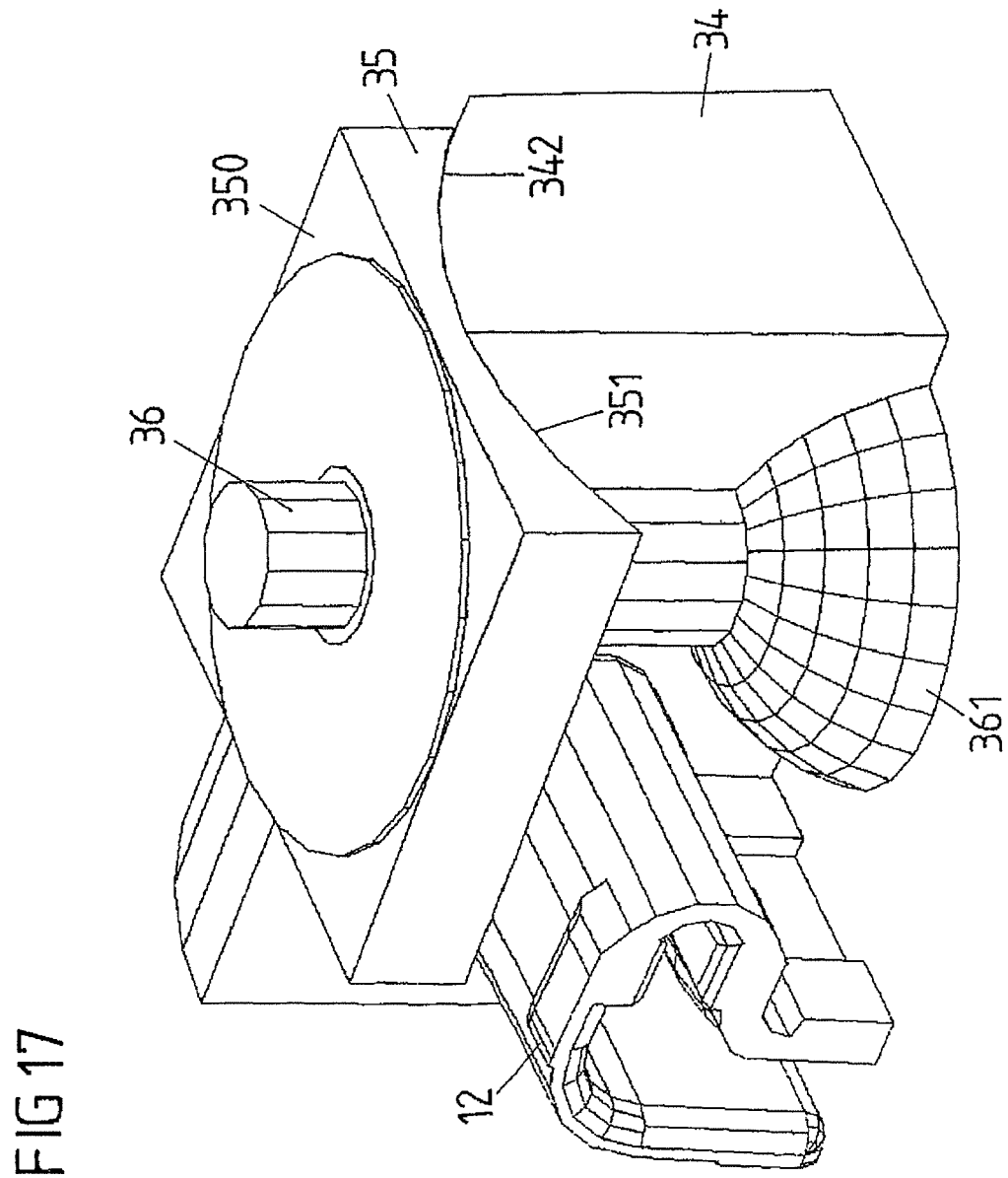
FIG. 17 shows a partial section through the slider shown in FIGS. 14 and 15.

FIG. 13 shows the third slider 33 formed as wraparound slider in an enlarged perspective view, whereas FIGS. 14 and 15 show an enlarged perspective representation of the first slider 31 absorbing forces in X- and Y-direction of the motor vehicle with its sliding surface 310. The third slider 33 extends around the guide path 61 forming the secondary guide at the outer edge of the carrier part 6 with its sliding surface 330 exclusively absorbing forces in Y-direction.

In a perspective representation of the upper region of the path-controlled window lifter, FIG. 14 illustrates the wraparound of the guide path 51 at the outer edge of the reinforcement part 5 by the sliding surface 310 of the first slider 310 and the connection of the reinforcement part 5 with the carrier part 6 via the connection point 46.

To achieve an optimum efficiency, the sliders 31, 32, 33 are designed such that they can move in all degrees of freedom, without jamming during adjustment of the driver 2 along the adjustment path of the path-controlled window lifter. For this purpose, the sliders as shown in FIGS. 16 to 21 include a guide piece 34, in which the sliding surface 340 is molded to accommodate one of the guide paths 51, 52, 61, which in FIGS. 16 to 19 is formed as sliding surface for absorbing forces in X- and Y-direction. As shown in FIG. 19, a sliding insert 12 can be inserted into the sliding surface 340, in particular when the material used for the guide piece 34 does not have optimum sliding properties.

The guide piece 34 contains a conical oblong hole 341 and at its end remote from the driver 2 a partly spherical recess 343, which adjoins the narrow end of the conical oblong hole 341, as well as a surface 342 formed as cylindrical portion, which faces the driver 2. Into the conical oblong hole 341 of the guide piece 34 the cylindrical body 360 of a ball pin 36 is inserted, whose head 361 is partly spherical and is mounted in the partly spherical recess 343 of the guide piece 34. The opposite foot 362 of the ball pin 36 is of cylindrical shape and includes a thread which is directly screwed to the driver 2 or to an internally threaded reinforcement disk 11 and hence is firmly connected with the driver 2.

Between the surface of the driver 2 facing the guide piece 34 and the cylindrical-portion-shaped surface 342 of the guide piece 34 a bearing cup 35 rotatable about the ball pin 36 is arranged, whose surface 350 facing the driver 2 rests against the driver 2, whereas the opposite side forms a concave, cylindrical-portion-shaped surface 351, which together with the convex cylindrical-portion-shaped surface 342 of the guide piece 34 forms a cylindrical-portion-shaped contact surface.

The formation of the conical oblong hole 341 in the guide piece 34 in conjunction with the partly spherical head 361 of the ball pin 36 in the partly spherical recess 343 in the guide piece 34 as well as the cylindrical-portion-shaped contact surface between the guide piece 34 and the bearing cup 35 and the arrangement of the sliding surface 340 in the guide piece 34 vertical to the ball pin 36 provides for the following degrees of freedom:

1. Displacement of the slider 31, 32, 33 along its associated guide path 51, 52, 61,
2. rotation of the slider 31, 32, 33 and hence of the driver 2 with respect to the associated guide path 51, 52, 61 of the stationary axis of the ball pin 36, and
3. swivelling of the slider 31, 32, 33 about the respective X-axis through the cylindrical-portion-shaped contact surface between the guide piece 34 and the bearing cup 35 to compensate angular deviations of the guide path with respect to the driver and/or the slider associated to the guide path.

Figure 18:
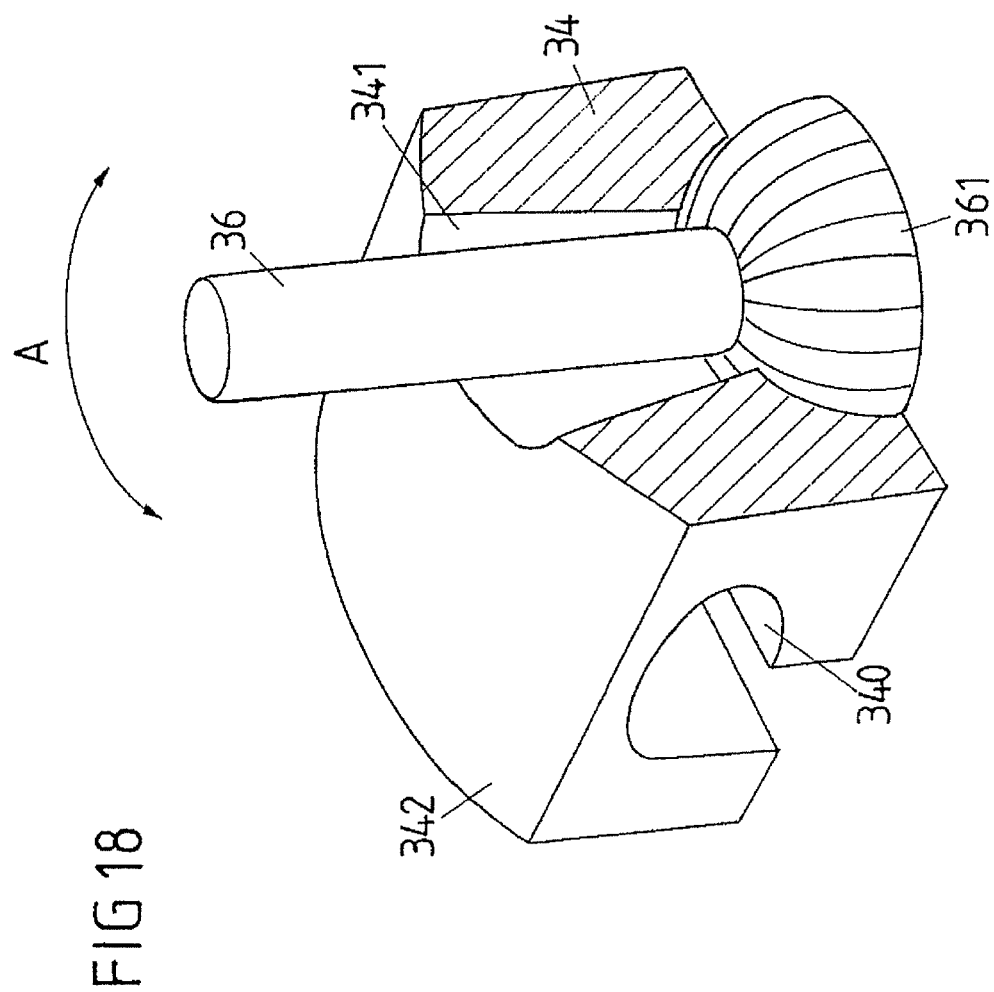
FIG. 18 shows a perspective representation of the slider shown in FIGS. 14 to 17 to explain the pivotability of the slider in only one swivel direction.
Figure 19:
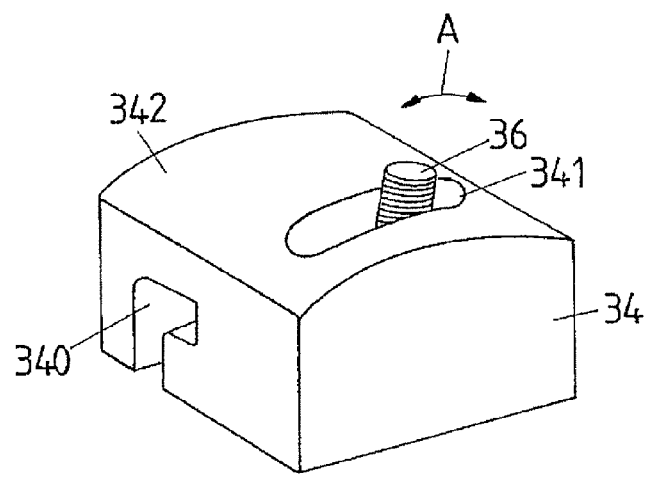
FIG. 19 shows a perspective representation of the slider shown in FIGS. 14 to 17 to explain the pivotability of the slider in only one swivel direction.

The ball pin 36 firmly connected with the driver 2 in the conical oblong hole 341 and the partly spherical recess 343 of the guide piece 34 can swivel in direction of the double arrow A as shown in FIGS. 18 and 19.

Figure 20:
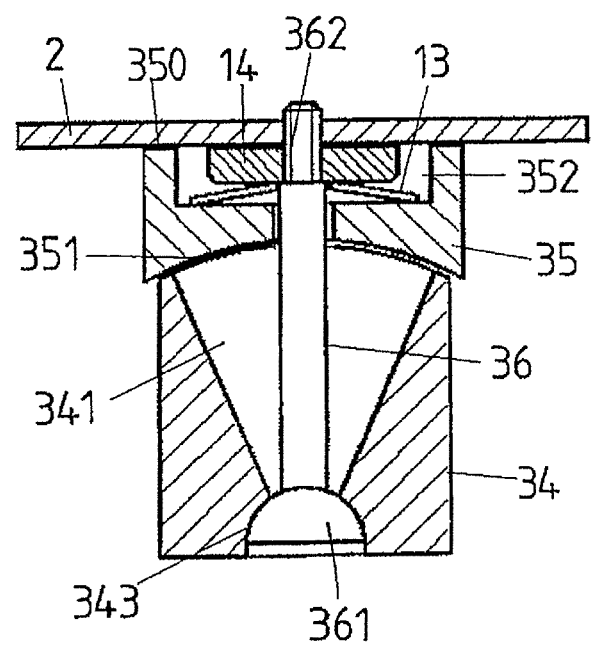
FIG. 20 shows a longitudinal section through a slider rotatable about the Y-axis of the motor vehicle and pivotable about an axis oriented vertical to the guide paths and located in the plane of the window pane.
Figure 21:
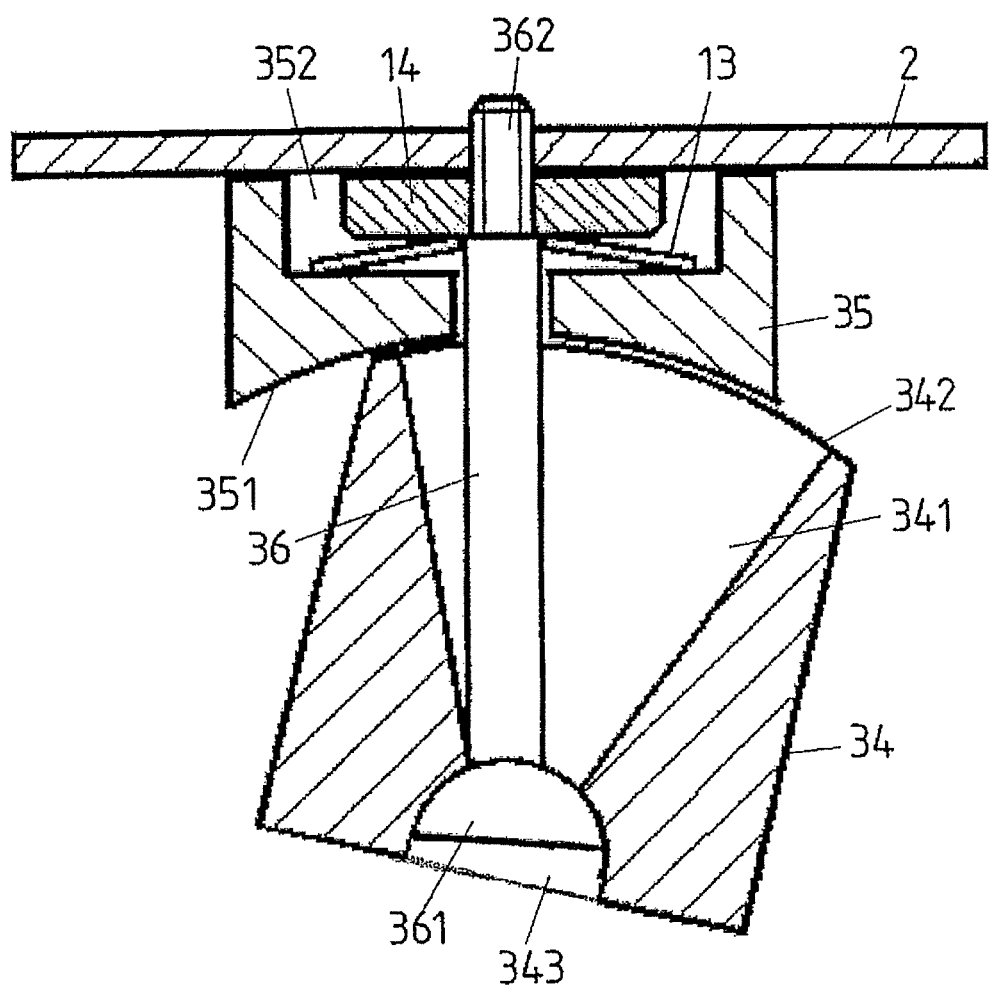
FIG. 21 shows a longitudinal section through the slider of FIG. 20 in the swivelled condition.

In FIGS. 20 and 21, a longitudinal section through the slider illustrates how the swivel movement is made to obtain the aforementioned degrees of freedom.

To overcome tolerance and noise problems, a spring element 13 in the form of a disk spring is arranged in a recess 352 of the bearing cup 35, which is arranged in the side of the bearing cup 35 facing the driver 2. Between the disk spring 13 and the side of the driver 2 facing the slider a pane 14 is arranged.

As can be taken from FIGS. 12 to 17, the guide pieces 34 of the sliders 31, 32, 33 are positioned offset with respect to the respective guide path 51, 52, 61, which results in a lever arm between the ball pin 36 and the respective guide path. The bearing of the guide pieces 34 offset with respect to the guide path 51, 52, 61 provides for a high compactness in Y-direction of the motor vehicle, as it is frequently necessary for space reasons to design the entire path-controlled window lifter as narrow as possible in the upper region in Y-direction of the motor vehicle.

By means of this construction, a better introduction of forces acting on the driver 2 and hence on the sliders 31, 32, 33 in Y-direction also is achieved, since a partial overlap of the head of the bearing pin 36 on the one hand and of the guide region of the reinforcement part 5 and of the carrier part 6 on the other hand is obtained. To prevent tilting of the ball pin 36 in Y-direction, the conical oblong hole 341 in the guide piece 34 is formed in only one direction and the cylindrical-portion-shaped contact surface between the bearing cup 35 and the guide piece 34 is aligned correspondingly, so that only one swivel direction of the sliders 31, 32, 33 is permitted.

The invention claimed is:

1. A path-controlled window lifter of a motor vehicle comprising:
    a driver being connected to a window pane of said motor vehicle and configured to be driven by a drive mechanism for adjusting the window pane;
    a base plate being connected to a structure of said motor vehicle and comprising a carrier part and a reinforcement part, wherein the carrier part and the reinforcement part each have respective faces that form a hollow portion therebetween, and
        are coupled only via bulges or formations formed in either or both of the carrier part or the reinforcement part, or
        are coupled only by a separate wave-shaped intermediate section, or
        are coupled only by a foam layer, wherein the base plate includes three guide paths for guiding said driver and for adjusting said driver along an adjustment path formed by said three guide paths, said reinforcement part defining a first and a second guide path of said three guide paths on edge regions of said reinforcement part, said first and second guide paths respectively including a first slider and a second slider both supporting the driver in a longitudinal and transverse direction of said motor vehicle, wherein the first and second slider each have sliding surfaces engaging said first and second guide paths, respectively, for guidance and force absorption both in the longitudinal and transverse direction of said motor vehicle, said carrier part defining a third guide path of said three guide paths in an edge region of said carrier part, said third guide path having a third slider supporting the driver only in the transverse direction of said motor vehicle, wherein the third slider has a sliding surface which engages said third guide path only in the transverse direction of said motor vehicle.

2. The window lifter of claim 1, wherein a width of said reinforcement part perpendicular to an adjustment direction of said driver is smaller than a width of said carrier part, and wherein said carrier part substantially overlaps said reinforcement part.

3. The window lifter of claim 2, wherein one of the first or second guide paths of said reinforcement part projects said overlap of said carrier part and wherein said third guide path of said carrier part is formed at an edge of said carrier part which is arranged opposite to said first or second guide path of said reinforcement part.

4. The window lifter of claim 1, wherein said reinforcement part is inserted into a stepped portion of said carrier part extending vertical to a longitudinal extension of said carrier part.

5. The window lifter of claim 1, wherein said first and second guide paths of said reinforcement part have a smaller distance between each other than to said third guide path of said carrier part.

6. The window lifter of claim 1, wherein the distance between said carrier part and said reinforcement part is fixed via formations or bulges of said carrier part or said reinforcement part.

7. The window lifter of claim 1, wherein the distance between said carrier part and said reinforcement part is fixed by a separate component arranged between said carrier part and said reinforcement part or by the foam layer connecting said carrier part and said reinforcement part.

8. The window lifter of claim 1, wherein said carrier part and said reinforcement part are made of the same or a different material, whereby when using the same material for said carrier part and said reinforcement part, said reinforcement part has a greater material thickness than said carrier part.

9. The window lifter of claim 4, wherein said reinforcement part comprises fiber-reinforced plastics or steel and said carrier part comprises plastics or another steel of lower strength than the steel of said reinforcement part.

10. The window lifter of claim 1, wherein said reinforcement part is made of a metal with higher specific weight, than the material of said carrier part.

11. The window lifter of claim 1, wherein said reinforcement part is made of a cast magnesium alloy, and said carrier part is made of a metal sheet.

12. The window lifter of claim 1, wherein said reinforcement part is made of metal and said carrier part is made of plastics.

13. The window lifter of claim 1, wherein said sliders are mounted to be rotatable about a transverse axis of said motor vehicle and pivotable about an axis oriented vertical to said guide paths and substantially located in the plane of the window pane.

14. The window lifter of claim 1, wherein at least one of the sliders includes a guide piece with sliding surfaces accommodating said guide path and a conical oblong hole through which a ball pin extends, whose head is partly spherical and is mounted in a partly spherical recess of said guide piece and whose foot is connected to said driver.

15. The window lifter of claim 13, wherein between said driver and said guide piece a bearing cup rotatable about said ball pin is located, whose side resting against said guide piece forms a cylindrical-portion-shaped contact surface with said guide piece, and wherein a spring element is located between said bearing cup and said driver.

16. The window lifter of claim 14, wherein said conical oblong hole of said guide piece accommodating said ball pin is arranged offset with respect to said guide path said conical oblong hole of said guide piece being formed to extend in only one direction and said cylindrical-portion-shaped contact surface between said guide piece and said bearing cup permitting only one swivel direction.

* * * * *